P. WILDE.
PLANT FOR WARMING AND MOISTENING THE SOIL SURFACE.
APPLICATION FILED JULY 11, 1918.

1,374,416.

Patented Apr. 12, 1921.

INVENTOR:
Poul Wilde
By Wm Wallace White
ATTY.

P. WILDE.
PLANT FOR WARMING AND MOISTENING THE SOIL SURFACE.
APPLICATION FILED JULY 11, 1918.

1,374,416.

Patented Apr. 12, 1921.
2 SHEETS—SHEET 2.

INVENTOR:
Poul Wilde
By Wm Wallace White
ATTY.

UNITED STATES PATENT OFFICE.

POUL WILDE, OF STRÖMMEN, NEAR RANDERS, DENMARK.

PLANT FOR WARMING AND MOISTENING THE SOIL-SURFACE.

1,374,416.	Specification of Letters Patent.	Patented Apr. 12, 1921.

Application filed July 11, 1918. Serial No. 244,359.

*To all whom it may concern:*

Be it known that I, POUL WILDE, a subject of the King of Denmark, residing at Strömmen, near Randers, in the Kingdom of Denmark, have invented new and useful Improvements in Plants for Warming and Moistening the Soil-Surface, of which the following is a specification.

The present invention relates to plants for heating and moistening the soil surface by means of steam conducted through a piping system deposited in the ground and consisting of an outer leaky duct and iron pipes placed within the same and fitted, at suitable intervals, with discharge openings for the steam.

As the outer leaky duct there are used tubes composed of an upper thin-walled porous half and a lower heavy-walled impervious half.

The novel feature of the present invention is that the lower half tube constitutes a member fitted with a continuous channel serving as steam-pipe and communicating, by way of upwardly directed orifices, with the steam-chamber formed below the porous half. This arrangement obviates the use of iron tubes as steam-pipe, whereby the plant becomes cheaper and easier to install.

Figure 1:
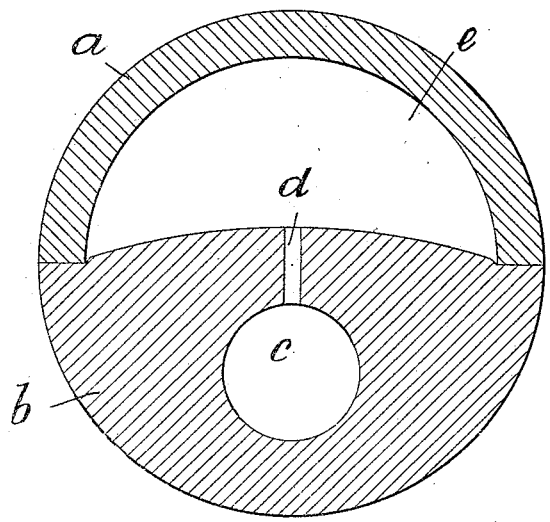
Figure 2:
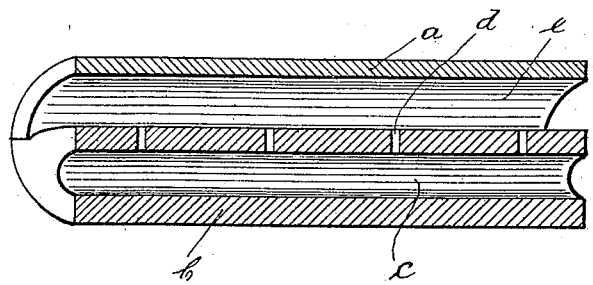

One manner of constructing the invention is illustrated on the drawings, in which Figure 1 is a vertical cross-section of the conduit, and Fig. 2 is a central longitudinal section of the same, broken away.

*a* is the upper porous half and *b* the lower impervious half or base block. It forms a member embodying a channel *c* serving as steam supply-pipe from the top of which holes *d* lead to the steam-chamber *e* formed below the upper half *a*.

Instead of the circular cross-section shown for the conduit *a*, *b*, it may have any other suitable cross-section. For instance, the lower half may be rectangular and the upper half semicircular as shown.

Having now particularly described and ascertained the nature of my said invention and in what manner the same is to be performed, I declare that what I claim is:—

1. A device of the class described, comprising a base block of impervious material provided with a centrally located, longitudinal bore and a plurality of vertically extending openings communicating with said bore, and a shell of porous material semicircular in cross-section and having its edges in close contact with the edges of said block thereby to form with the upper side of the block a closed chamber in communication with said vertical openings.

2. A device of the class described, comprising a base formed of impervious material and having a flat upper side, said block being provided with a centrally located, longitudinal bore and a plurality of vertical openings passing through said flat side and communicating with said bore, and an upper member having its edges in close contact with the edges of the flat side of the block and adapted to form a closed chamber between said flat side and the inner wall of said member.

In testimony whereof I have signed my name to this specification in the presence of two subscribing witnesses.

POUL WILDE.

Witnesses:
V. BELSCHUER,
AXEL DUCKERT.